United States Patent [19]
Posgate

[11] 3,918,817
[45] Nov. 11, 1975

[54] TURBIDIMETERS
[75] Inventor: Edward S. Posgate, Brampton, Canada
[73] Assignee: Wacan Hydro-Flow Ltd., Rexdale, Canada
[22] Filed: Feb. 1, 1974
[21] Appl. No.: 438,622

Related U.S. Application Data
[63] Continuation-in-part of Ser. No. 361,060, May 17, 1973, abandoned.

[52] U.S. Cl. ................ 356/208; 250/574; 250/576; 356/246
[51] Int. Cl.² ........................................ G01N 21/24
[58] Field of Search .................... 356/208, 243, 246; 250/573–576

[56] References Cited
UNITED STATES PATENTS

| | | | |
|---|---|---|---|
| 3,234,846 | 2/1966 | Cropper et al. ................ | 356/208 X |
| 3,522,436 | 8/1970 | Posgate ....................... | 356/208 UX |

FOREIGN PATENTS OR APPLICATIONS

| | | | |
|---|---|---|---|
| 1,144,408 | 3/1969 | United Kingdom ................ | 356/246 |

*Primary Examiner*—Ronald L. Wibert
*Assistant Examiner*—F. L. Evans
*Attorney, Agent, or Firm*—Fetherstonhaugh & Co.

[57] ABSTRACT

A turbidimeter having a thermal insulating housing for mounting a receiver in a close fitting relationship within a passage formed in the housing so as to prevent condensation forming on the surface of the receiver. The receiver is in the form of a glass test tube which is rectangular in cross-section to increase the range of turbidity readings which can be taken by measuring scattered light. The means for providing a reading of turbidity includes an amplifier circuit which has switch means operative in response to movement of a test tube within the housing to switch to and from a high and low resistance as required to reduce the hysterisis in the circuit resulting from the removal of the test tube from the housing. A standard calibrating reference in the form of a sealed ampoule containing sterilized water of zero turbidity is adapted to fit within the turbidimeter for use in calibration of the meter. A standard zero turbidity reference consisting of an ampoule containing water of zero turbidity which is sealed at its upper end is provided with a collar which is adapted to be received in a sleeve mounted on the housing so as to support the standard reference in a position to provide a zero reference for the metering device.

18 Claims, 9 Drawing Figures

TURBIDIMETERS

This invention is a continuation-in-part of application Ser. No. 361,060, filed May 17, 1973, now abandoned.

FIELD OF INVENTION

This invention relates to turbidimeters. In particular this invention relates to an improved turbidimeter which includes the housing, substantially eliminating condensation on the sample receiver and additional improvements which increase the sensitivity of the apparatus.

PRIOR ART

Frequently the samples which are tested in the turbidimeter are at the temperature which is substantially different from the temperature of the surrounding atmosphere in which the tests are carried out. The turbidimeters usually employ a glass test tube as the receiver and it is very common to find a substantial amount of condensation on the surface of the glass container. This condensation may result in errors in the measurement of the turbidity due to the fact it interfers with the passage of light to and from the sample.

In addition it has been common practice to mount a test tube or glass container in a pre-determined position with respect to the light source by means of metal clamping devices. It has been found that when attempting to take the tentative readings of turbidity the transmission of heat to and from the test tube or glass container by way of the metal clamping structure effects the accuracy of the meter reading. A further difficulty which is experienced when the sensitivity of a turbidimeter is increased is that when the test tube or glass container is removed from its position between the light source and the directly aligned photocell, the greatly increased light imposed on the photocell causes its resistance to reduce considerably. The photocell resistance controls the input voltage to the amplifier circuit, and when it is reduced the input voltage to the amplifier increases. When the test tube is replaced in its operative position when the turbidimeter is set in its most sensitive range, three to four minutes may elapse before the pointer on the meter returns to its original measurement. This amount of time is required by the amplifier to readjust to the original input voltage as controlled by the photocell. This means that when the apparatus is in use in its most sensitive range, the test readings cannot be taken rapidly one after another.

With my prior turbidimeter, as described in U.S. Pat. No. 3,522,436 issued Aug. 4, 1970, and in the present meter when a circular test tube is employed, the highest measurement which can be accurately made is in the range of about 750 to 800 Jackson turbidity units (JTU). At this approximate level the meter reading starts to reverse. This is because the suspension in the liquid is concentrated and the light is not reflected from particles on to the scattered light photocell. The direct light photocell starts to measure direct light transmitted only. The two photocells are part of a Wheatstone bridge, and when the scattered light is nil the electrical resistance of the related photocell becomes very high. This causes the circuit to go out of balance and only direct light is measured. This measurement is indicated by the pointer on the meter traveling in a reverse direction. While this characteristic may be employed to measure the percentage of light transmitted, it is necessary to remove the scale used for measuring scattered light and to replace it by a scale for measuring direct light. The change-over from measuring scattered light to measuring direct light may be achieved by providing a switch to reverse the polarity of the DC galvanometer and to obtain a measurement from left to right. The switch may be operated manually or automatically to electrically reverse the polarity when a reading exceeding 800 J.T.U. is detected. This modification does, however, call for a more complex system than that required when measuring scattered light.

The present invention eliminates the problem of condensation on the surface of the glass container by providing a thermal insulating housing which has a passage therein for receiving the test tube in a close fitting, sliding relationship, the clearance between the wall of the glass container and the housing being so small that the air gap does not contain a sufficient amount of moisture to form any significant condensation on the surface of the test tube. Preferably the housing is made from a plastic material.

The hysterisis in the meter has been considerably reduced by providing for the switching of the meter from the high sensitivity circuit to a low sensitivity circuit prior to the removal of the test tube from its position between the light source and the direct light photocell. Preferably this adjustment is effected automatically when the test tube is removed from its operative position within the housing.

It has been found that the measurement of turbidity can be increased by employing a test tube receiver which is rectangular in cross-section. By arranging the rectangular receiver in a position with a smaller width being positioned in the direction in which the scattered light is measured, it is possible to obtain measurements indicative of much higher turbidity because of the reduced resistance to the passage of reflected light.

The present invention also provides improved sensitivity by employing a structure which includes a collimating lens disposed between the light source and the test tube and a light diffuser disposed between the test tube and both direct and scattered light photocells.

SUMMARY OF INVENTION

According to an embodiment of the present invention, a turbidimeter comprises a receiver for receiving a liquid sample to be tested and a thermal insulating housing for the test tube. The insulating housing has a passage formed therein adapted to receive the receiver in close fitting sliding relationship such that the clearance between the container and the housing is such as to prevent condensation forming on the surface of the receiver during testing. The housing is provided with additional passage means opening therethrough and light source means and light sensing means aligned with the additional passages, and a meter for providing a reading of the turbidity of the sample tested.

According to a further embodiment of the present invention, there is provided a metering device having a variable shunt resistance adjustable to a low resistance for low sensitivity readings and a high resistance for high sensitivity readings, and switch means for automatically switching the meter to the low resistance circuit when the test tube is removed from an operative position within the housing.

According to a still further embodiment of the present invention, high turbidity readings can be obtained by employing a receiver which is rectangular in cross-section and disposed with its narrow cross-section extending in the direction of the scattered light photocell in use.

According to yet another embodiment of the present invention, there is provided a zero reference standard consisting of a sealed ampoule containing zero turbidity water. The ampoule is provided with a collar which is adapted to be received in a complementary sleeve mounted on the housing.

According to a further embodiment of the present invention, there is provided first and second reflected light photocell sensing means disposed on opposite sides of the direct light plane. The first reflected light photocell sensing means is disposed at an angle to the direct light plane and the second reflected light photocell sensing means is disposed at an angle to the direct light plane which is equal to the angle at which the first light sensing means is located with respect to the direct light plane.

PREFERRED EMBODIMENT

The invention will be more clearly understood after reference to the following detailed specification read in conjunction with the drawings wherein.

Figures 1, 4:
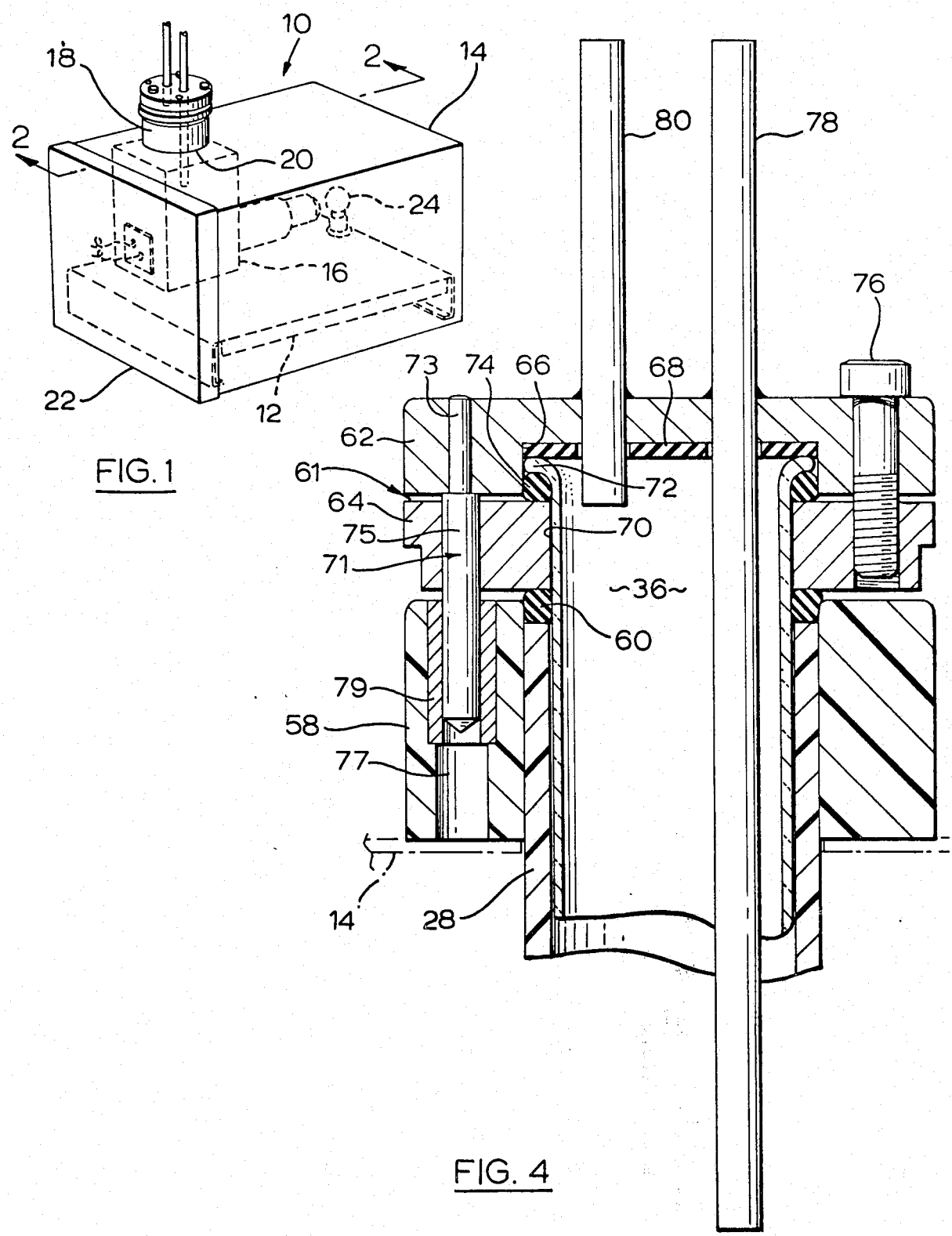
FIG. 1 is a pictorial view diagrammatically illustrating a turbidimeter device according to an embodiment of the present invention.
FIG. 4 is a sectional view of the upper end of a receiver in the direction of the plane 4—4 of FIG. 3.
Figure 3:
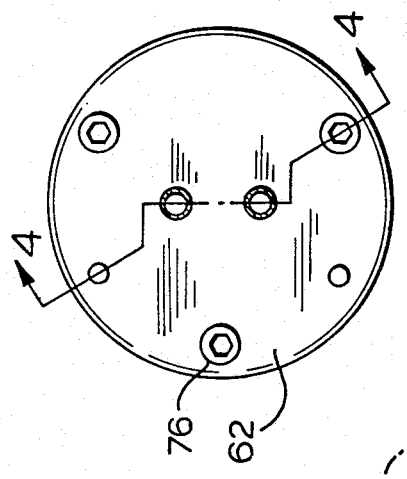
FIG. 3 is a top view of a receiver taken in the direction of the line 3—3 of FIG. 2.

With reference to FIG. 1 of the drawings, reference numeral 10 refers generally to a turbidimeter device according to an embodiment of the present invention. The turbidimeter 10 consists of a base 12, which is mounted within a case 14, a housing 16, which is mounted on the base 12 and disposed within the case 14, and a receiver 18, which extends through an opening 20 in the case into the housing 16. The casing 14 is open at one end and closed by a removable lid 22. A light source 24 is mounted on the base.

Figure 2:
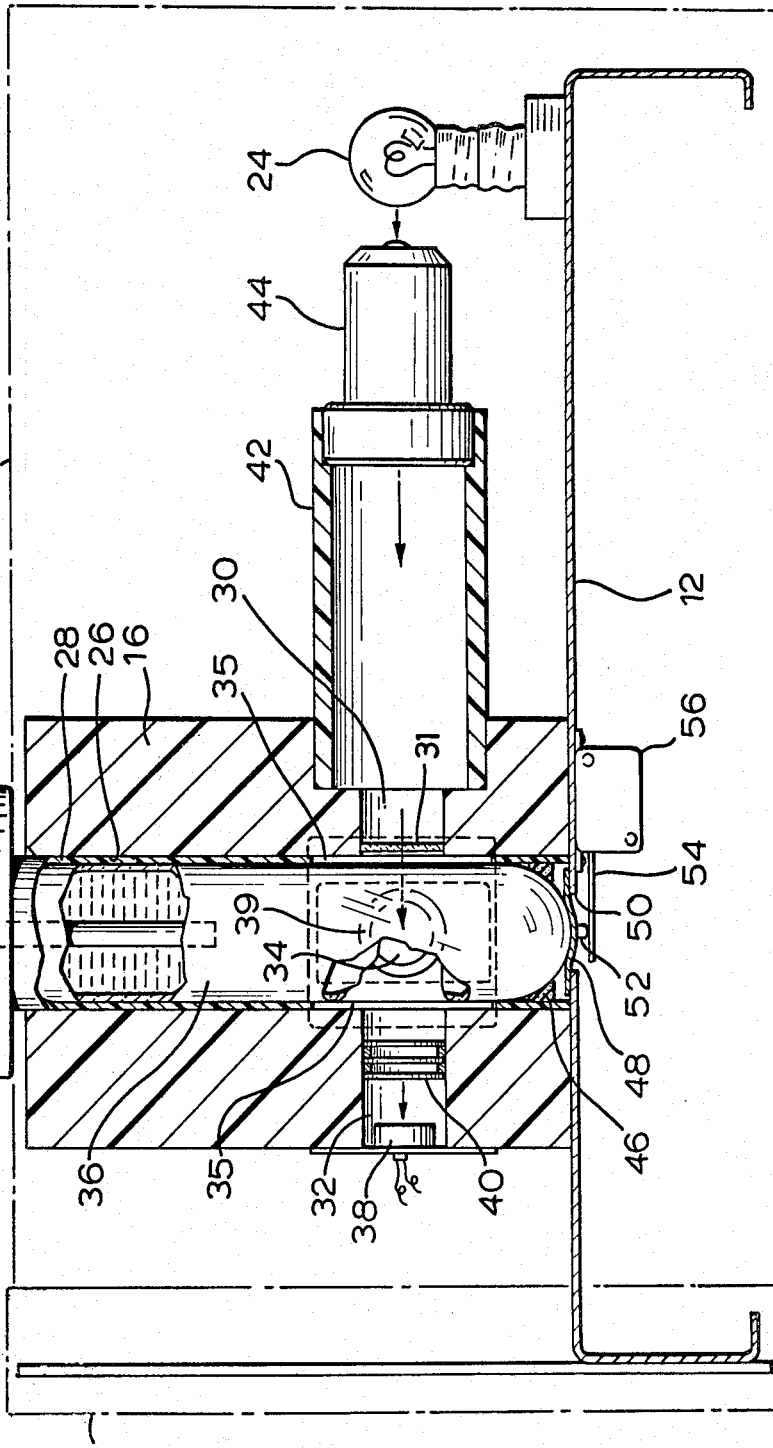
FIG. 2 is a partial sectional side view made along the line 2—2 of FIG. 1.

With reference to FIG. 2 of the drawings, it will be seen that the housing 16 is formed with a passage 26 extending longitudinally therethrough. A thin sleeve is located within the passage 26 and projects upwardly beyond the upper edge of the housing 16 outwardly from the casing 14. The housing 16 also has additional passages 30, 32 and 34 opening outwardly therefrom.

The housing 16 and sleeve 28 are made from a thermal insulating material, preferably a plastic material such as nylon or polyethylene or polyvinyl chloride or the like, and the combined thickness of the wall of the housing 16 and the sleeve 28 is preferably of the order of about 1 inch so that there will be very little heat transferred through the combined thickness of the sleeve and housing walls. Sleeve 28 may also be isolated from housing 16 by an air gap, the only contact between sleeve 28 and housing 16 being at the extreme ends of sleeve 28. When construction is done in this way thermal differentials between the glass container, sleeve 28, housing 16 and the two air gaps is greatly reduced. The close reduction in temperature differential between all components and air substantially reduces any precipitation of moisture on the surface of the glass container. In this construction sleeve 28 may be made of metal preferably copper because of its high transfer rate of temperature. A clear lens 31 is disposed in the passage 30. The lens 31 is made from a thermal insulating pipe of glass and serves to prevent heat loss in the gap surrounding the receiver resulting from mixing of the entrapped air with the air in the tubular support member 42 of the lens. Similarly a light diffuser 40 prevents heat losses through the passage 32. The volume of air which is entrapped within the housing when the test tube is positioned therein is so small that its temperature will be rapidly adjusted to the temperature of the receiver thereby preventing any moisture in the entrapped air from precipitating onto the surface of the receiver.

In the embodiment illustrated in FIGS. 1 to 4 of the drawings the receiver 36, in the form of a conventional circular glass test tube, fits within the passage formed within the sleeve 28 in a close fitting, sliding relationship. Preferably there is an air gap between the inner surface of the sleeve and the outer surface of the test tube of width of about 0.030 inches, which has been found sufficient to ensure that the test tube may be easily located within the housing while not permitting any significant amount of condensation on the surface of the receiver in use.

A direct light sensing photocell 38 is mounted in the passage 32 and a light diffuser 40 is located within the passage 32 between the test tube and the photocell 38 and passage 34 and photocell 39. The light diffusers, which consist of several opaque discs of low reflection, serve to uniformly distribute the light over the surface of the photocell 38 and this contributes to the ability of the apparatus to function successfully in a more sensitive range of turbidity reading. A tubular support member 42 is axially aligned with the passage 30 and supports a light collimating lens device 44 in axial alignment with the light source 24, passages 30, 35, 32 and direct light photocell 38. The light collimating device 44 may be any one of a number of such devices which are commercially available. Similarly the photocells 38 and 39 may be standard photocells.

A small annular sponge 46 consisting of silica-gel is mounted adjacent the lower end of the sleeve 28 and has an inner surface contoured to correspond to the shape of the lower end of the test tube. Sponge 46 serves to collect any moisture which might be contained in the air gap between sleeve 28 and housing 16. A flexible diaphragm 48 extends across an opening 50 formed in the base plate 12 in alignment with the lower end of the sleeve 28. The diaphragm 48 has a protuberance 52 projecting therefrom which is adapted to engage a control arm 54 of a switch 56.

As clearly shown in FIG. 4 of the drawings, the sleeve 28 projects above the top wall of the casing 14 and is surrounded by a sleeve 58, which is made from a plastic material. The sleeve 58 has a slightly greater length than the length of the portion of the sleeve 28 which projects beyond the casing 14 so that an 0 ring 60 can be conveniently located in the shoulder area provided at the upper end of the sleeve 28. The open end of the test tube 33 is closed by means of and end cap assembly 60 which consists of an end closure member 62 and an annular collar 64. The closure member 62 has a circular recess 66 formed therein and a resilient liner 68 is located within the recess 66. The collar member 64 has a circular passage 70 therein that receives the upper end of the test tube 33 in a close fitting relationship. The lip 72 of the test tube is clamped between an 0-ring 74 and the resilient liner 68 by means of clamping screws 76 which clamp the end closure member 62 and the collar 64.

Input tube 78 and output tube 80 extend through passages formed in the end closure member 62 and resilient liner 68. The input tube 78 is preferably of a greater length than the output tube 68 so that the liquid which is to be tested is discharged directly into the area of the test tube at which readings are to be taken.

Because of the increased sensitivity of the apparatus of the present invention, it is important to insure that the test tube can be repeatedly positioned in the same location with respect to the housing. To achieve this result a dowel pin 71 is mounted in the end cap assembly 60. The dowel pin 71 has an upper portion 73 which is located within the closure cap 62 and a lower portion 75 which is located within the collar 64. A passage 77 is formed in the sleeve 58 and a liner 79 is located within the upper end of the passage 77. The lower end of the dowel pin 71 is adapted to fit in a close fitting relationship within the liner 79. When the test tube is calibrated it is tightly clamped within the closure cap 60 previously described and should always be returned to its calibrated position within the housing by locating the dowel pin 71 with the sleeve 79.

Figure 5:
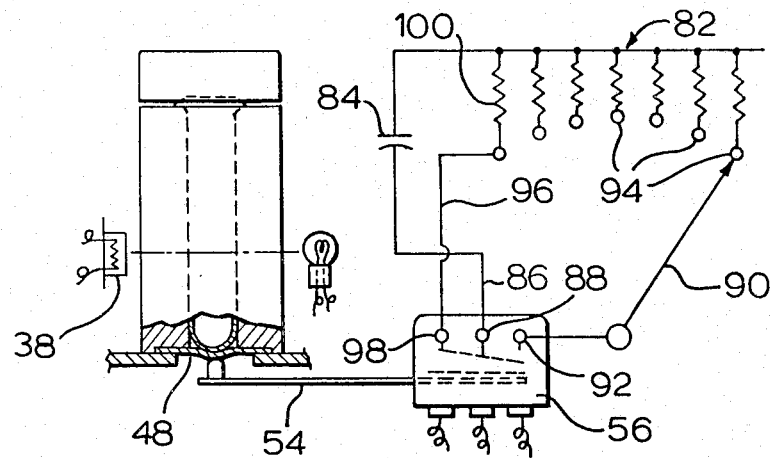
FIG. 5 is a diagrammatic representation of the circuit and apparatus used for reducing hysteresis.

With reference to FIG. 5 of the drawings, the reference numeral 82 refers generally to the variable shunt resistance of the meter which is connected in parallel with the capacitor 84 through switch 56. The line 86 connects the terminal 88 of the switch to the shunt and line 90 is adapted to connect terminal 92 to any one of the terminals 94 of the shunt. Line 96 connects the terminal 98 of the switch 56 to a low resistance 100 of the shunt. The switch 56 is a two way switch capable of selectively making contact with terminal 92 or 98 as required. Movement of the switch between terminals 92 and 98 is effected by switching arm 54 which projects outwardly from the switch to underlie the test tube as previously described with reference to FIG. 2 of the drawings. Preferably the switch 54 is in the form of a micro-switch. When the test tube is in position the sensitivity of the meter may be adjusted by adjusting the shunt resistance so that the terminal 92 of the switches in contact with any one of the terminal 94 of the shunt resistance. The switch 56 is held in the position in which the terminal 92 is operatively connected in the circuit. When the test tube is removed the diaphragm 48 rises thereby permitting the switch 54 to rise and causing the micro-switch to break the contact with terminal 92 and establish contact with terminal 98. This has the effect of removing the high resistance from the circuit and introducing the low resistance 100 to the circuit. Because of the fact that the low resistance is activated before the test tube is withdrawn from its operative position disposed between the light source 24 and the photocell 38 the hysteresis which results from the decrease in resistance of the photocell 38 is considerably decreased. It has been found that whereas if the test tube is removed with the meter held in the high resistance setting it can take some three to four minutes to stabilize the meter readings when the test tube is replaced whereas with the circuit of the present invention this has been reduced to from 5 to 10 seconds.

Figure 6:
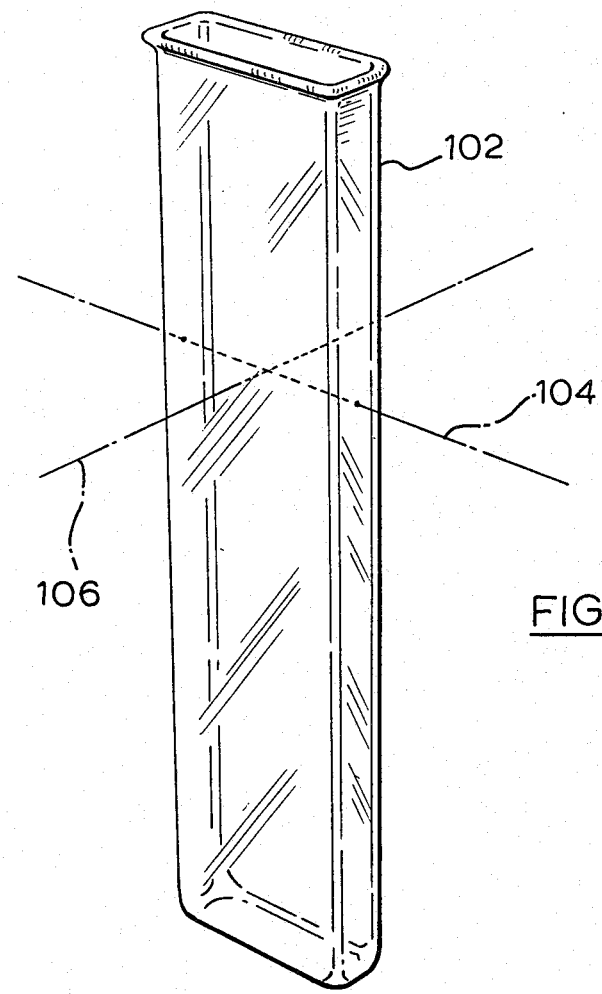
FIG. 6 is a pictorial view of a test tube receiver according to an embodiment of the present invention.

As previously indicated difficulty has been experienced in attempting to obtain readings of high turbidity. This results from the fact that while the light source may be sufficiently strong to penetrate the sample directly a scattered light in a plane normal to the direct passage of light may be so small that readings can not be taken. The receiver or test tube 102 illustrated in FIG. 6 of the drawings overcomes these difficulties by reason of the fact that it is substantially rectangular in cross-section. A suitable test tube of this construction may measure one-fourth inch by 1 inch cross-section. The test tube 102 is mounted in the housing in a position with the long axis 104 aligned with the direct passage of light and the short axis 106 aligned with the axis of the photocell 39. Because the width of the test tube in the direction of the axis 106 is substantially less than the width in the direction of the axis 104, the resistance to the passage of light through the sample in the direction of the axis 104 is substantially less than that with a circular test tube of a diameter comparable to the width of the test tube 102 in the direction of the axis 104. This insures that with a light source of the intensity required to penetrate the conventional circular test tube is capable of giving readings of reflected light when used with the rectangular test tube which are indicative of substantially higher turbidity. It has also been found that rectangular or square test tubes can be made with much greater precision than is the case with round test tubes. In the case of round test tubes it is necessary to calibrate each one to make them interchangeable. This is done according to prior art by rotating the tubes until a "0" reading is obtained and then locking them into position. By using precision made flat glass rectangular or square test tubes, the optical imperfections encountered in round test tubes are eliminated.

It will be understood that when this apparatus is in use various test tube devices each having a clamp attached thereto may be positioned one at a time within the housing in order to obtain readings of turbidity. With the device such as that of the present invention the test tube with the cap attached may remain in fluid communication with the body of fluid which is to be periodically tested. Alternatively the clamping tubes 78 and 30 may be connected to any one of a number of sources of liquid which are to be tested so that only one test tube is required.

Figure 7:
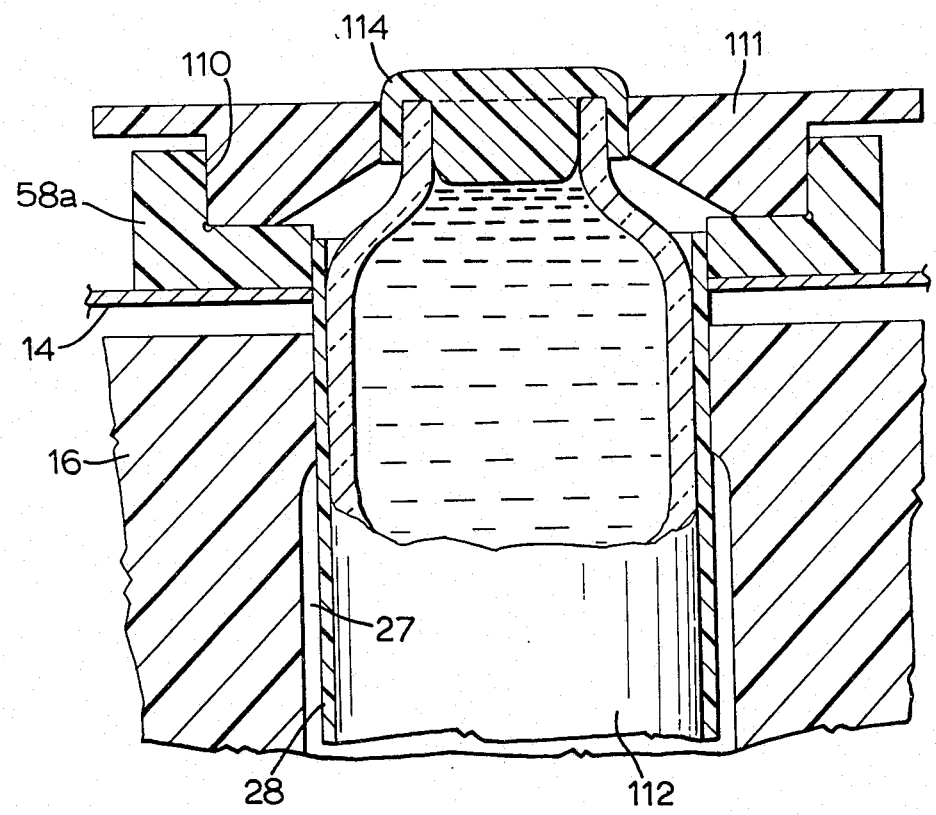
FIG. 7 is a partial cross section of a portion of a turbidimeter illustrating the mounting of a primary reference standard.

FIG. 7 illustrates a further embodiment of this invention wherein a sleeve 58a is secured to the upper wall 14 of the turbidimeter and has an annular recess 110 extending coaxially with respect to the sleeve 28. An ampoule 112 filled with sterile water of zero turbidity is closed and sealed at its upper end by means of an end seal 114. It will be understood that the collar member 64 illustrated in FIG. 4 of the drawings may be modified so as to fit within the annular recess formed in the sleeve 58a of FIG. 7. Similarly the sleeve 58a may be modified to provide a passage for receiving a dowel pin 75 so that the standard reference ampoule may be replaced by a receiver of the type illustrated in FIGS. 2 and 4. There is a considerable advantage to using a sealed ampoule containing sterilized water of zero turbidity in that it provides an absolute zero reference. Prior reference standards have called for the filling of a standard test tube with water of zero turbidity. However, in order to achieve this it has been necessary to prepare the sterilized water immediately prior to its use and this is a costly and time consuming operation.

FIG. 7 also serves to illustrate a further embodiment of the invention wherein an annular recess 27 is formed in the passage 26 to provide an insulating air gap extending around the sleeve 28. This air gap further improves the thermal insulating characteristics of the housing.

Figure 8:
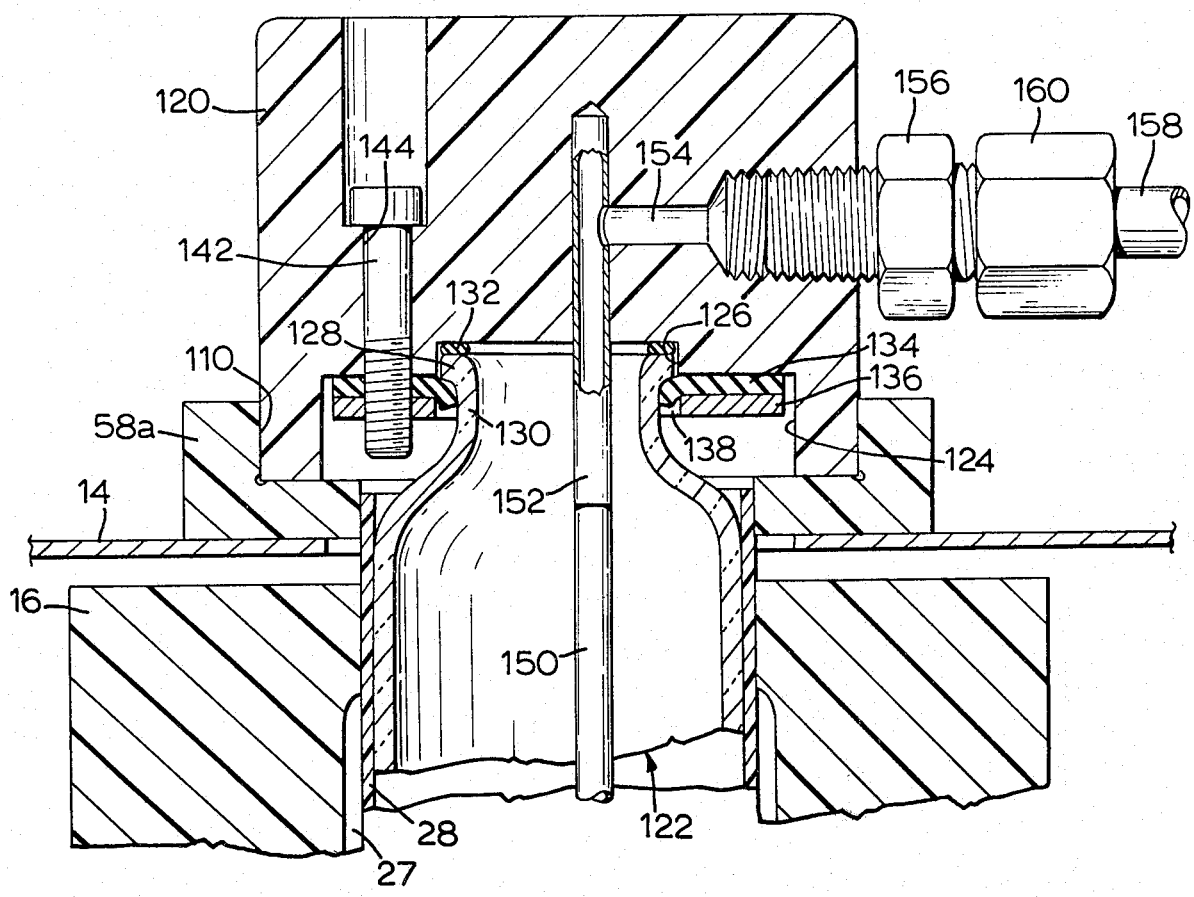
FIG. 8 is a cross-sectional view similar to FIG. 7 illustrating a receiver mounted in a head suitable for positioning within the mounting sleeve of FIG. 7.

FIG. 8 illustrates a head assembly 120 suitable for mounting a standard ampoule 122 in the sleeve assembly 58a previously described in FIG. 7 of the drawings. As previously indicated, the sleeve 58a has an annular recess 110 arranged concentrically with the axis of the central passage. The head 120 has an external diameter at its lower end adapted to fit in a close fitting sliding relationship within the recess 110. A first recess 124 opens inwardly from the lower face of the head 120 and a second recess 126 of a smaller diameter opens inwardly from the recess 124. The second recess 126 is adapted to receive the lip portion 128 at the outer end of the neck portion 130 of the ampoule. An 0-ring 132 is located in the passage 126 and is clamped between the outer end face of the ampoule and the inner wall of the recess 126 in use. A resilient sealing ring 134 is located with its inner edge underlying the lip 128 at the outer end of the neck. The resilient sealing ring 134 is resiliently deformable to pass over the lip 128 to be located in the position shown in FIG. 8. A clamping ring 136 has a bore 138 of a diameter greater than the external diameter of the lip portion 128 so that it may pass freely over the lip portion to the position shown in FIG. 8. The clamping ring 136 has a plurality of threaded passageways 140 formed therein. A plurality of clamping screws 142 (only one shown) extend through passages 144 formed in the head and threadably engage the passages 140 of the clamping ring. The clamping screws 140 are tightened so that the resilient sealing ring 134 is compressed between the lip 128 and the clamping ring 140 so that the receiver 122 is retained in the head. It has been found that with the structure illustrated, it is possible to seal the receiver to the head sufficiently tightly to withstand pressures up to 80 p.s.i. without leakage.

The head 120 is provided with an input tube 150 and an output tube 152. The output tube extends downwardly from the head 120 and is in communication with a transverse passage 154 which is adapted to be threadably connected to a coupler 156 which in turn is coupled to a fluid transmitting conduit 158 by means of a coupler 160. The input tube 150 is connected to a similar conduit (not shown) through passages and couplers formed in the head in a manner similar to those of the output tube 152.

The head illustrated in FIG. 8 of the drawings provides a simple and inexpensive structure for use in mounting receivers of a type which have a neck which is smaller in diameter than the body of the receiver. The head 120 is also specifically adapted for use in association with the sleeve 58a which is also adapted for use in association with the standard reference as described above with respect to FIG. 7 of the drawings.

In use, the sealed reference ampoule is located within the housing and the turbidimeter is calibrated. By reason of the fact that the reference ampoule contains a sealed quantity of water of zero turbidity, it is possible to obtain an accurate reading for zero turbidity in the initial setting of the meter. The fact that the ampoule is sealed permits repeated use of the same zero turbidity water. After the calibration, the reference ampoule is removed and is replaced by a receiver. The liquid to be tested is fed to the receiver through the input conduit 78 and discharged through the conduit 80. Continuous readings of turbidity may be taken as required. The switch 56 and its associated operating mechanisms serve to ensure that the light source 24 is deactivated when the receiver is removed from its position and disposed between the light source and the photocells.

Figure 9:
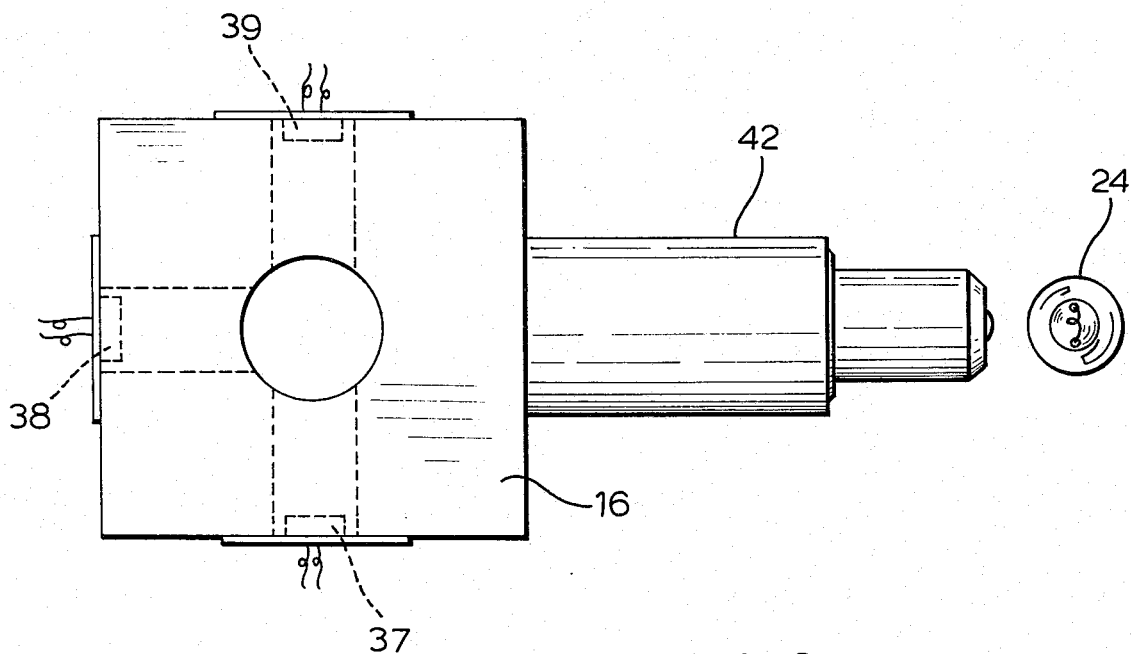
FIG. 9 is a plan view of a turbidimeter having two reflected light photocell sensors.

FIG. 9 of the drawings illustrates a further embodiment of the invention wherein in addition to the direct light sensing photocell 38 and the reflected light photocell sensing device 39, there is provided a second reflected light sensing photocell 37. Both the first and second reflected light photocell sensing devices are disposed at right angles to the direct light plane extending from the lamp 24 to the direct light sensing photocell 38. The measurement of turbidity obtained from the reflected light photocells 37 and 39 is correlated to provide a mean reading which is transmitted to the meter display scale of the device. This structure has the advantage that it is capable of providing a reading of turbidity which takes into consideration variations in the turbidity within a sample. It is possible that with only reflected light photocell sensing means, variations in the turbidity within a sample might lead to a reading of turbidity quite substantially different from the average turbidity of the sample. The use of two reflected light sensing photocells also minimizes the effects of imperfections in the glass of which the sample test tube is made.

From the foregoing, it will be apparent that the present invention overcomes the difficulties of the prior art described above by eliminating the problem of condensation in the test tube, increasing the sensitivity of the apparatus, reducing the hysteresis in the meter resulting from removal and replacement of the test tube and increasing the upper range of turbidity readings by applying a test tube which is substantially rectangular. These and other improvements will be apparent from the foregoing specification.

Various modifications of the embodiments of the invention described in the foregoing specification will be apparent to those skilled in the art without departing from the scope of the invention.

What I claim as my invention is:

1. A turbidimeter comprising
   a. receiver means for receiving a liquid sample to be tested,
   b. thermal insulating housing means having first passage means therein for receiving said receiver means in a close fitting sliding relationship whereby the clearance between the receiver and the housing is so small as to prevent condensation forming on the surface of the receiver,
   c. sealing means at the upper and lower ends of said first passage to seal said passage closed when a receiver means is located therein, d. additional passage means in said housing opening into said first passage means,
e. light source means and light sensing means aligned with said additional passage means,
f. reader means communicating with said light sensing means for providing a reading of the turbidity of a sample tested.

2. A turbidimeter as claimed in claim 1 wherein the clearance between the receiver and the housing is about 0.03 inches.

3. A turbidimeter as claimed in claim 1 wherein said housing has a wall thickness of about 1 inch.

4. A turbidimeter as claimed in claim 1 where said housing is made from a plastic material.

5. A turbidimeter as claimed in claim 1 wherein said housing is made from a plastic material selected from the group consisting of nylon, polyethylene and polyvinyl chloride (PVC).

6. A turbidimeter as claimed in claim 1 including liner means for said first passage means, said liner means being formed from plastic material and projecting outwardly from the upper end of said housing, said receiver means having cap means adapted to sealingly engage the portion of the liner which projects upwardly from said housing.

7. A turbidimeter as claimed in claim 6 including sleeve means extending about said upwardly projecting portion of said liner and register means for locating said cap in a predetermined position with respect to said sleeve whereby said receiver may be located in a precalibrated relationship with respect to said light source.

8. A turbidimeter as claimed in claim 7 wherein said cap consists of an end closure member and a collar member which cooperate with one another to clamp an upper end of a receiver therein in a sealed and closed relationship, and input and output conduit means opening through said end closure member to permit the passage of liquid and out of said receiver as required.

9. A turbidimeter as claimed in claim 1 wherein said receiver is in the form of a standard glass test tube.

10. A turbidimeter as claimed in claim 1 wherein said receiver consists of a glass container which has a rectangular cross-section having a width in a first direction which is disposed normal to the path of the light source which is less than the width in the second direction coextensive with the path of the light source.

11. A turbidimeter as claimed in claim 10 wherein the width of the glass container in said first direction is less than half the width of the test tube in the second direction.

12. A turbidimeter as claimed in claim 1 wherein said light sensing means includes transmittance and reflected photocells and light diffusing means disposed between said light source and said transmittance and reflected photocells.

13. A turbidimeter as claimed in claim 1 including tubular support means mounted on and projecting outwardly from said housing and having a passage therein aligned with said light source and one of said additional passage means and light collimating means carried by said tubular support means to provide optical amplification of the light at said receiver.

14. A turbidimeter as claimed in claim 1 wherein said means for providing a reading of turbidity includes amplifier circuit means including capacitor means, shunt resistor means having a plurality of resistors ranging from a high resistance to a low resistance and first line means selectively connectable to any of said resistors and second line means connected to a low resistor of said shunt and switch means for connecting said capacitor to either said first or second line means, said switch means being operative in response to movement of said test tube relative to said housing.

15. A turbidimeter as claimed in claim 1 wherein said receiver means comprises a sealed ampoule of sterile water of zero turbidity.

16. A turbidimeter as claimed in claim 1, wherein said light sensing means includes direct light photocell means aligned with said light source in a direct light plane, first reflected light photocell sensing means disposed at an angle to the direct light plane and second reflected light photocell sensing means located on the opposite side of said direct light plane at an angle to the direct light plane equal to the angle at which said first light sensing means is located with respect to said direct light plane, said first and second reflected light photocell means being equally spaced of said receiver means.

17. A turbidimeter as claimed in claim 16, wherein said first and second reflected light sensing means are disposed at right angles to said direct light plane.

18. In combination, a turbidimeter and calibration reference means for calibrating said turbidimeter, said turbidimeter comprising, a housing formed with a passage opening into said housing for receiving a receptacle for a liquid sample to be tested, means for measuring the turbidity of a sample located within said passage, collar means secured relative to said housing and disposed radially outwardly from the open end of said passage, said calibration reference means comprising transparent receptacle means having a neck opening at one end thereof, said receptacle being substantially filled with sterile water of zero turbidity, end closure means for closing said container and sealing said water within said container, collar means secured to said end closure and projecting laterally outwardly of said receptacle to engage said sleeve means of said housing to locate said receptacle with said passage means in a position to permit calibration of said turbidimeter.

* * * * *